US012482151B2

United States Patent
Batra et al.

(10) Patent No.: US 12,482,151 B2
(45) Date of Patent: Nov. 25, 2025

(54) STROKE-GUIDED SKETCH VECTORIZATION

(71) Applicant: Adobe Inc., San Jose, CA (US)

(72) Inventors: Vineet Batra, Pitam Pura (IN); Matthew David Fisher, Burlingame, CA (US); Deepali Aneja, Seattle, WA (US); Ashwani Chandil, Noida (IN); Ankit Phogat, Noida (IN)

(73) Assignee: Adobe Inc., San Jose, CA (US)

( * ) Notice: Subject to any disclaimer, the term of this patent is extended or adjusted under 35 U.S.C. 154(b) by 1027 days.

(21) Appl. No.: 17/530,760

(22) Filed: Nov. 19, 2021

(65) Prior Publication Data

US 2023/0162413 A1 May 25, 2023

(51) Int. Cl.
G06T 11/20 (2006.01)
G06T 5/70 (2024.01)
G06T 7/194 (2017.01)
G06T 7/30 (2017.01)
G06V 10/75 (2022.01)

(52) U.S. Cl.
CPC .............. *G06T 11/203* (2013.01); *G06T 5/70* (2024.01); *G06T 7/30* (2017.01); *G06V 10/751* (2022.01); *G06T 7/194* (2017.01); *G06T 2207/20081* (2013.01)

(58) Field of Classification Search
None
See application file for complete search history.

(56) References Cited

U.S. PATENT DOCUMENTS

| | | | |
|---|---|---|---|
| 7,636,097 B1 * | 12/2009 | Holloway | G09G 5/00 345/611 |
| 10,192,129 B2 | 1/2019 | Price et al. | |
| 10,522,253 B2 | 12/2019 | Itu et al. | |
| 10,726,599 B2 | 7/2020 | Marzban et al. | |
| 11,048,932 B2 | 6/2021 | Batra et al. | |
| 12,333,634 B2 | 6/2025 | Chandil et al. | |
| 2010/0008576 A1 * | 1/2010 | Piramuthu | G06T 7/155 382/173 |

(Continued)

OTHER PUBLICATIONS

U.S. Appl. No. 17/519,357, "Final Office Action", U.S. Appl. No. 17/519,357, Jul. 31, 2024, 47 pages.

(Continued)

*Primary Examiner* — Jeffrey J Chow
(74) *Attorney, Agent, or Firm* — FIG. 1 Patents

(57) ABSTRACT

A stroke-guided vectorization system is described that generates, from an input sketch and guide image depicting an approximate vector representation of the sketch, an aligned guide image depicting an improved vector representation of the sketch. To do so, the stroke-guided vectorization system determines black levels representing a vector stroke in the input sketch and white levels representing a background in the input sketch. The stroke-guided vectorization system determines a black threshold value and a white threshold value for discrete portions of the aligned guide image using subsets of the black levels and subsets of the white levels determined using the input sketch. Each discrete portion of the aligned guide image is then mapped to a vector stroke or a background based on the black threshold value and the white threshold value of the portion.

20 Claims, 8 Drawing Sheets

(56) References Cited

U.S. PATENT DOCUMENTS

2011/0221754 A1    9/2011    Wang et al.
2021/0064858 A1*   3/2021    Batra .................. G06N 3/08
2023/0109732 A1    4/2023    Hertzmann et al.
2023/0137233 A1    5/2023    Chandil et al.

OTHER PUBLICATIONS

U.S. Appl. No. 17/519,357, "Non-Final Office Action", U.S. Appl. No. 17/519,357, Jul. 19, 2023, 31 pages.
U.S. Appl. No. 17/519,357, "Final Office Action", U.S. Appl. No. 17/519,357, Nov. 21, 2023, 41 pages.
U.S. Appl. No. 17/519,357, "Non-Final Office Action", U.S. Appl. No. 17/519,357, Feb. 1, 2024, 36 pages.
"Natural neighbor interpolation", Wikipedia, The Free Encyclopedia [online][retrieved Sep. 15, 2021]. Retrieved from the Internet <https://en.wikipedia.org/w/index.php?title=Natural_neighbor_interpolation>., Jan. 21, 2007, 2 Pages.
Chandil, Ashwani et al., "U.S. Application as Filed", U.S. Appl. No. 17/519,357, filed Nov. 4, 2021, 55 pages.
Olsen, Sven et al., "Image Simplification and Vectorization", NPAR '11: Proceedings of the ACM SIGGRAPH/Eurographics Symposium on Non-Photorealistic Animation and Rendering [retrieved Sep. 20, 2021]. Retrieved from the Internet <http://citeseerx.ist.psu.edu/viewdoc/download?doi=10.1.1.229.1285&rep=rep1&type=pdf>., Aug. 5, 2011, 10 Pages.
Simo-Serra, Edgar et al., "Learning to simplify: fully convolutional networks for rough sketch cleanup", ACM Transactions on Graphics, vol. 35, No. 4 [retrieved Sep. 15, 2021]. Retrieved from the Internet <https://openreview.net/pdf?id=oKI46KgqZe>., Jul. 11, 2016, 11 Pages.
Simo-Serra, Edgar et al., "Mastering Sketching: Adversarial Augmentation for Structured Prediction", ACM Transactions on Graphics, vol. 37, No. 1 [retrieved Sep. 15, 2021]. Retrieved from the Internet <https://openreview.net/pdf?id=Jhkn3is-gl>., Jan. 10, 2018, 13 Pages.
Wang, Ting-Chun et al., "High-Resolution Image Synthesis and Semantic Manipulation With Conditional GANs", Cornell University, arXiv, arXiv.org [retrieved Dec. 13, 2021]. Retrieved from the Internet <https://openaccess.thecvf.com/content_cvpr_2018/CameraReady/0768.pdf>., Nov. 2017, 10 Pages.
Zhu, Jun-Yan et al., "Unpaired Image-to-Image Translation using Cycle-Consistent Adversarial Networks", 2017 IEEE International Conference on Computer Vision (ICCV) [retrieved Dec. 13, 2021]. Retrieved from the Internet <https://eva.fing.edu.uy/pluginfile.php/320560/mod_resource/content/1/Zhu_Unpaired_Image-To-Image_Translation_ICCV_2017_paper.pdf>., Nov. 15, 2018, 10 pages.
"Notice of Allowance", U.S. Appl. No. 17/519,357, Feb. 20, 2025, 11 pages.
"Corrected Notice of Allowability", U.S. Appl. No. 17/519,357, filed May 20, 2025, 3 pages.

\* cited by examiner

STROKE-GUIDED SKETCH VECTORIZATION

BACKGROUND

Sketching plays a significant role in the digital graphic design process, as digital graphics often originate from paper sketches. For instance, artists often first create sketches on paper using pen or pencil before turning to computer-implemented tools to create a digital version of the sketch. Conventional approaches for digital graphics generation convert paper sketches to digital vector graphics by representing underlying sketch geometry as Bezier curves. With advances in computing device technology, some digital graphics systems enable artists to scan or take a picture of a sketch and convert the sketch into a digital graphic format. However, conventional approaches are unable to generate high-fidelity vector representations of sketches, and important content depicted in a sketch is often lost during generation of the corresponding vector representation.

SUMMARY

A stroke-guided vectorization system is described that generates, from a hand-drawn input sketch and guide image depicting a vector representation of the sketch, an aligned guide image. The aligned guide image is a vector representation of the input sketch that represents an improvement over the guide image by capturing additional details of the input sketch not depicted in the guide image. To generate the aligned guide image, the stroke-guided vectorization system leverages vector strokes included in the guide image and creates an adaptive exposure filter for the input sketch. The adaptive exposure filter defines a per-pixel exposure field for the input sketch based on the guide image's vector strokes, designating values indicating whether content in the guide image pixel represents a stroke (e.g., a black pixel value) or a background (e.g., a white pixel value).

Based on the black and white pixel values, the stroke-guided vectorization system defines corresponding thresholds for generating an aligned vector representation of the input sketch to be output as the aligned guide image. Pixel values in the input sketch that satisfy a black threshold value are used to define a vector stroke in the aligned guide image while pixel values in the input sketch that satisfy a white threshold value are used to define a background portion for the aligned guide image. The aligned guide image and the input sketch are then useable as a training pair for training a machine learning algorithm to translate between a sketch image domain and a vector graphic domain.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In some implementations, entities represented in the figures are indicative of one or more entities and thus reference is made interchangeably to single or plural forms of the entities in the discussion.

DETAILED DESCRIPTION

Figure 1:
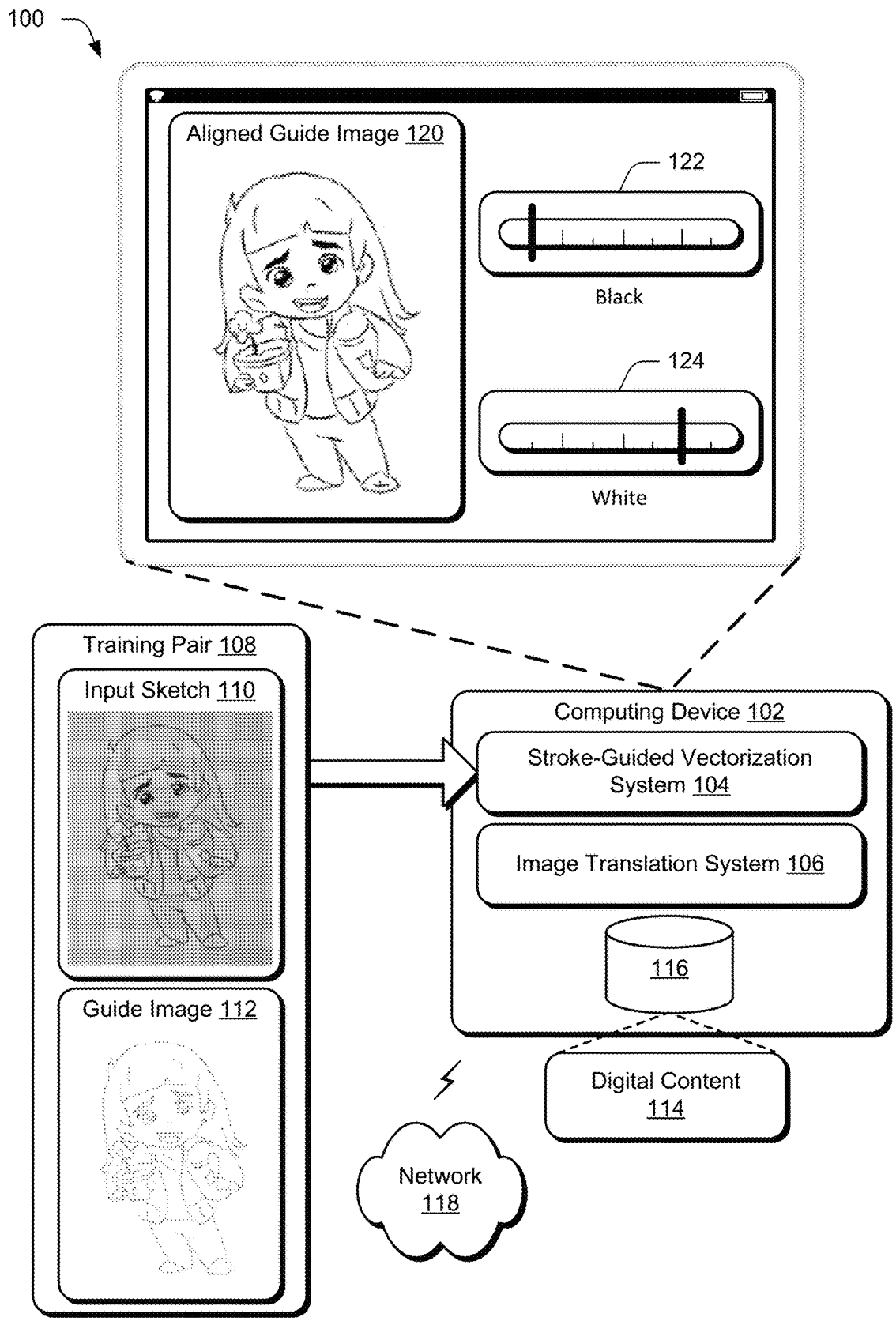
FIG. 1 is an illustration of a digital medium environment in an example implementation that is operable to employ a stroke-guided vectorization system to generate an aligned guide image for replacing a guide image in a training pair that includes the guide image and a corresponding input sketch.

To assist content creators in translating paper sketches into digital vector graphic representations, conventional systems train deep learning networks to map images of sketch inputs to vector outputs. However, the algorithms used to convert input sketch images to vector outputs are unable to generate vector outputs that accurately reflect their corresponding sketches due to the presence of different backgrounds, smudges, over-sketching, and other artifacts in the sketches. To address these problems, some approaches attempt to clean sketch images prior to processing in an attempt to mitigate the adverse impact of sketch backgrounds, artifacts, and the like. As an example, some conventional sketch cleaning approaches designate global exposure values for an entire sketch image to differentiate between foreground (e.g., pen or pencil strokes) and background (e.g., paper), and process a globally exposed image of the input sketch. While this global exposure approach is often suitable for very simple sketches, it fails to capture nuances of complex sketches, such as sketches with shadows, sketches made on paper with background lines or grids, and so forth.

To address these conventional shortcomings, a stroke-guided vectorization system is described that generates aligned guide images that are useable to train a deep learning network for translating between a corresponding sketch and the aligned guide image. To do so, a sketch dataset is obtained that includes a plurality of training pairs, where each training pair includes an input sketch and a corresponding guide image. The input sketch is a digital copy of a hand-drawn sketch (e.g., photograph, scan, etc.) and the guide image is a vector representation of the sketch, such as a vector representation generated by an artist tracing over the input sketch using digital pen or pencil tools. Because the guide image is an artist's intentional reproduction of the sketch image, the training pairs in the sketch dataset are useable to train a deep learning network to output vector representations when provided a sketch image as input.

However, when an artist creates a vector representation of sketch artwork, there are often alignment issues between the sketch and vector representation, such as stroke overshoots, stroke undershoots, misalignments, over-sketching (e.g., multiple pencil strokes intended to represent a single stroke), and other irregularities. These irregularities create ambiguities when learning similarities between sketches and vectors. Consequently, models trained using such misaligned training pairs frequently output artifacts when generating vector representations from input sketches. To mitigate problems caused by misaligned training pairs, the stroke-guided vectorization system is configured to generate an aligned guide image based on an input sketch and guide image. The guide image in the training pair is then replaced with the aligned guide image, and the training pair is subsequently useable to train a deep learning network to output improved vector representations from input sketches relative to conventional approaches.

To generate the aligned guide image, the stroke-guided vectorization system leverages vector strokes from the original guide image to create an adaptive exposure filter for the corresponding input sketch. The adaptive exposure filter represents a per-pixel exposure field for the input sketch and quantifies values designating whether depicted content in the pixel represents a stroke (e.g., pen, pencil, etc.) or a background (e.g., paper surface). These values are then used to define thresholds for generating a vector representation of the input sketch, such that pixel values satisfying a threshold value are used to define a vector stroke.

In the following discussion, an example environment is described that is configured to employ the techniques described herein. Example procedures are also described that are configured for performance in the example environment as well as other environments. Consequently, performance of the example procedures is not limited to the example environment and the example environment is not limited to performance of the example procedures.

In contrast to the conventional shortcomings noted above, the aligned guide image generated using techniques described herein depicts salient details depicted in the input sketch (e.g., imperfections inherent to hand-drawn sketches) that are not represented in the original guide image. By capturing only salient details, the aligned guide image is generated without capturing incidental details depicted in the input sketch (e.g., background lines of paper on which the input sketch is drawn). By capturing salient details and ignoring incidental details, the resulting training pair including the input sketch and the aligned guide image includes fewer ambiguities relative to conventional training datasets that include guide images depicting incidental details. Beyond the benefit of providing a higher-fidelity vector representation of the input sketch, the aligned guide image provides the technical benefit of enabling a machine learning algorithm to deterministically translate from a distribution of sketch images to a distribution of aligned guide images during training. Being trained on training data generated using the techniques described herein, a machine learning model is configured to output higher quality vector representations of sketch images, independent of a corresponding guide vector image.

Example Environment

FIG. 1 is an illustration of a digital medium environment 100 in an example implementation that is operable to employ techniques described herein. As used herein, the term "digital medium environment" refers to the various computing devices and resources utilized to implement the techniques described herein. The digital medium environment 100 includes a computing device 102, which is configurable in a variety of manners.

The computing device 102, for instance, is configurable as a desktop computer, a laptop computer, a mobile device (e.g., assuming a handheld or wearable configuration such as a tablet, mobile phone, smartwatch, etc.), and so forth. Thus, the computing device 102 ranges from full resource devices with substantial memory and processor resources (e.g., personal computers, game consoles) to low-resource devices with limited memory and/or processing resources (e.g., mobile devices). Additionally, although a single computing device 102 is shown, the computing device 102 is representative of a plurality of different devices, such as multiple servers utilized by a business to perform operations "over the cloud."

The computing device 102 is illustrated as including a stroke-guided vectorization system 104 and an image translation system 106. The image translation system 106 is representative of a network that learns to translate from a first distribution of images to a second distribution of images (e.g., from satellite view to street view images, from raster to vector images, from black and white to color images, and so forth). The image translation system 106 is configurable using variety of deep learning network architectures for mapping between different image distributions, such as a Pix2Pix adversarial network. For instance, the image translation system 106 represents a Pix2Pix adversarial network trained in accordance with the techniques described by Isola, et al. in Image-to-Image Translation with Conditional Adversarial Networks, 2017 IEEE Conference on Computer Vision and Pattern Recognition (CVPR), the disclosure of which is hereby incorporated by reference. In accordance with aspects of this disclosure, the image translation system 106 is configured as a network trained with machine learning to map from a distribution of raster images to a distribution of vector images using a plurality of training pairs, where each training pair includes a sketch and a vector representation of the sketch.

Training pair 108 represents an example of a training pair included in training data for the image translation system 106 and includes an input sketch 110 and a guide image 112. The input sketch 110 is a raster image of an artist's sketch, such as a picture or scan of a hand-drawn sketch on paper using pen, pencil, etc. The guide image 112 is a vector image that includes an artist's representation of the input sketch 110. For example, to generate the training pair 108 an artist is prompted to upload an image of a hand drawn sketch to a computing device and generate a vector representation of the hand drawn sketch by tracing over the image of the hand drawn sketch using one or more digital vector graphics tools. The input sketch 110 and the guide image 112 are representative of digital content 114 maintained in storage 116 of the computing device 102, maintained in storage of a different computing device connected to the computing device 102 via network 118, or combinations thereof.

The stroke-guided vectorization system 104 is representative of functionality of the computing device 102 to generate an aligned guide image 120 configured for replacing the guide image 112 in the training pair 108. The stroke-guided vectorization system 104 thus represents computer readable instructions that are executable to perform tasks involved in generating the aligned guide image 120. Various tasks involved in generating the aligned guide image are represented in the following discussion as being performed by modules of the stroke-guided vectorization system 104, such that each module represents computer readable instructions that are executable to produce an output of the module. The computer readable instructions of the stroke-guided vectorization system are platform-independent, meaning that the stroke-guided vectorization system 104 is configured for implementation on a variety of computing platforms having a variety of processors.

The aligned guide image 120 is a computer-generated vector representation of the input sketch 110 that exhibits improved alignment and a higher fidelity representation of the input sketch 110 relative to the guide image 112. In generating the aligned guide image 120, the stroke-guided vectorization system 104 regards vectors included in the guide image 112 as an approximate, but inaccurate, vector equivalent of the input sketch 110. The stroke-guided vectorization system 104 leverages information included in the guide image 112 for identifying corresponding locations in the input sketch 110 that include sketch strokes (e.g., artist intended pen or pencil strokes rather than background paper lines, smudges, shadows, etc.).

Specifically, information included in the guide image 112 is used to determine local exposure filters for different regions of the input sketch 110. In some implementations, exposure filters are pixel-specific, such that the stroke-guided vectorization system 104 determines upper and lower constraints for a "sketch threshold" at each pixel. For pixels in the guide image 112 that include a vector stroke, the stroke-guided vectorization system 104 interprets that there is at least one salient sketch curve near a corresponding pixel in the input sketch 110.

The stroke-guided vectorization system 104 then determines a black level and a white level for a pixel in the input sketch 110 indicated by the guide image 112 as including a salient sketch curve. To do so, the stroke-guided vectorization system 104 employs a fixed kernel (e.g., a nine-pixel radius) and computes a local minimum value and a local maximum value for the pixel based on observed pixel values within the fixed kernel. For instance, in a grayscale color space representation, where zero represents black and 255 represents white, each pixel in an image is assigned a value between zero and 255, inclusive, representing an intensity of the pixel. The local minimum value is thus designated as the black level for the pixel and the local maximum value is designated as the white level for the pixel. Rather than over-constraining to a single value or global exposure for differentiating between sketch stroke and non-sketch stroke regions of the input sketch 110, the stroke-guided vectorization system 104 uses the upper and lower constraints represented by the black and white levels as approximated constraints for identifying strokes in the input sketch 110. The stroke-guided vectorization system 104 repeats this process of computing upper and lower constraints to define a sketch threshold for each pixel of the input sketch 110 identified by the guide image 112 as including a salient sketch curve.

After computing the black and white levels that define a pixel-specific sketch threshold for pixels in the input sketch 110, the stroke-guided vectorization system 104 generates the aligned guide image 120 by interpolating the black and white levels derived for nearby pixels. For instance, the stroke-guided vectorization system 104 determines whether a pixel in the aligned guide image 120 should include a vector stroke by interpolating from a set of nearest neighbor pixels in the input sketch 110 having assigned black and white levels. The nearest neighbor black and white levels are interpolated separately to define a black threshold and a white threshold for the pixel.

The black threshold represents a lower bound pixel value, such that a pixel in the input sketch 110 having a value that fails to satisfy the lower bound (e.g., a value less than, or less than or equal to, the lower bound) is mapped to a vector in the aligned guide image 120. Similarly, the white threshold represents an upper bound pixel value, such that a pixel in the input sketch 110 having a value that satisfies the upper bound (e.g., a value greater than, or greater than or equal to, the upper bound) is mapped to a background in the aligned guide image 120.

For a pixel having a value that satisfies its lower bound and fails to satisfy its upper bound (e.g., a value between the black and white thresholds), the stroke-guided vectorization system 104 interpolates to determine whether the pixel maps to a vector in the aligned guide image 120. As an example, in an implementation where the lower bound for a pixel is 100 and the upper bound for the pixel is 200, the stroke-guided vectorization system 104 maps the pixel to background in the aligned guide image 120 if its value is greater than or equal to 150. Conversely, the stroke-guided vectorization system 104 maps the pixel to a vector stroke in the aligned guide image 120 if its value is less than 150. Although this example assumes linear interpolation, the stroke-guided vectorization system 104 is configured to use any suitable form of interpolation in accordance with the techniques described herein.

After mapping each pixel in the input sketch 110 to a vector or background in the aligned guide image 120, the stroke-guided vectorization system 104 outputs the aligned guide image 120. In some implementations, outputting the aligned guide image 120 includes replacing the guide image 112 with the aligned guide image 120 in the training pair 108. In some implementations, the stroke-guided vectorization system 104 is configured to output the aligned guide image 120 for display by the computing device 102. For instance, the aligned guide image 120 is output for display via a user interface of the stroke-guided vectorization system 104 together with one or more controls configured to enable adjustment of the black and white thresholds for one or more pixels.

As an example, FIG. 1 includes a black threshold control 122 and a white threshold control 124. Input at the black threshold control 122 is useable to adjust a value defining the black threshold (e.g., a value between 0 and 255) for one or more pixels in the aligned guide image 120 while input to the white threshold control 124 is useable to adjust a value defining the white threshold for the one or more pixels. In this manner, the stroke-guided vectorization system 104 enables a user of the computing device 102 to further refine parameters for generating a vector representation of the input sketch 110. However, the stroke-guided vectorization system 104 is configured to generate a high-fidelity vector representation of the input sketch 110 independent of (e.g., without) user input when generating the aligned guide image 120 using techniques described herein.

Having considered an example digital medium environment, consider now a discussion of an example system useable to generate an aligned guide image for an input sketch.

Stroke-Guided Vectorization System

Figure 2:
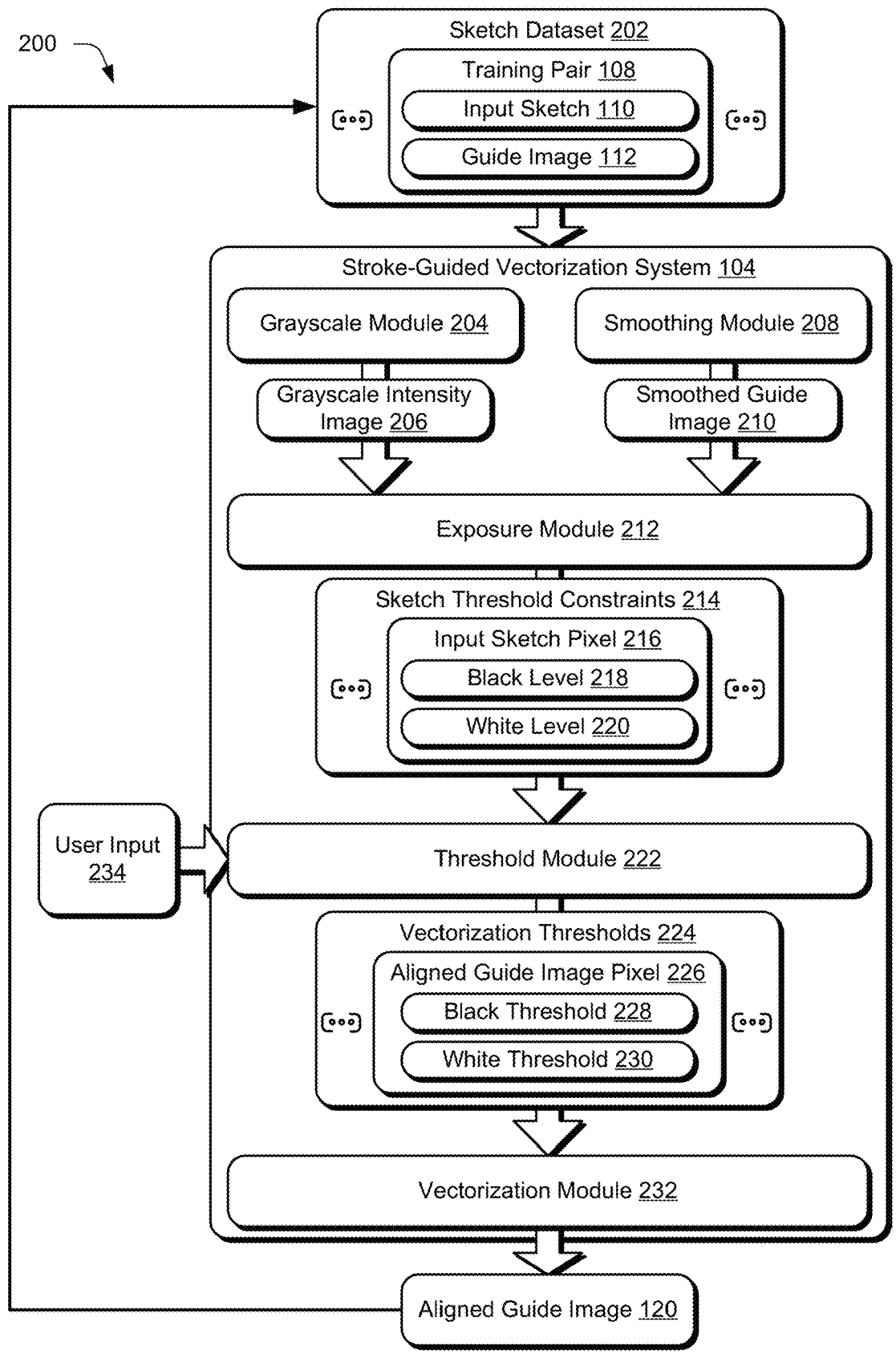
FIG. 2 depicts a digital medium environment showing operation of the stroke-guided vectorization system of FIG. 1 in greater detail.

FIG. 2 depicts a digital medium environment 200 in an example implementation showing operation of the stroke-guided vectorization system 104 of FIG. 1 in greater detail.

Figure 3:
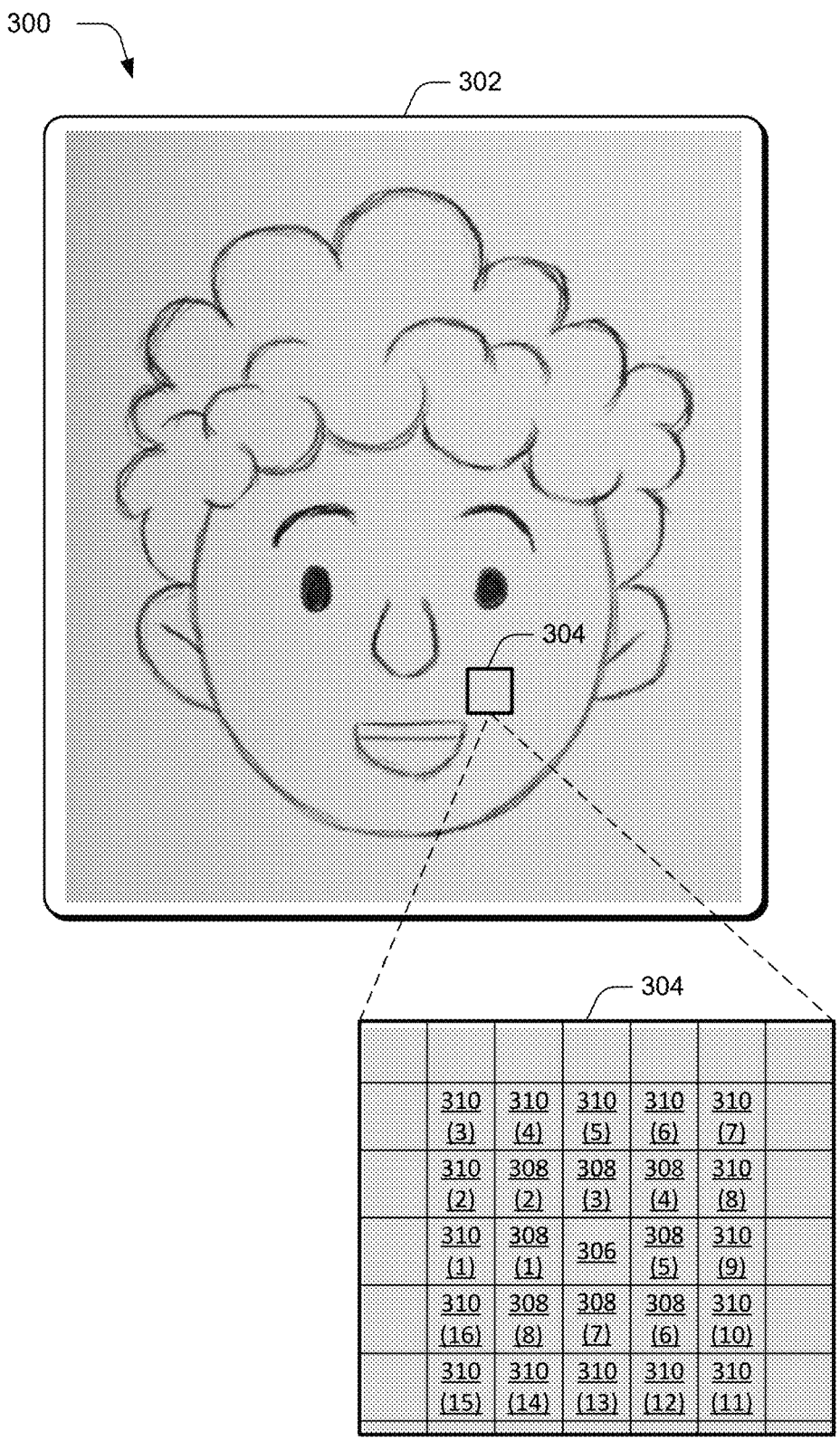
FIG. 3 depicts a digital medium environment that includes an example input sketch used by the stroke-guided vectorization system of FIG. 1 to generate an aligned guide image.

FIG. 3 depicts a digital medium environment 300 that includes an example input sketch used by the stroke-guided vectorization system 104 of FIG. 1 to generate an aligned guide image.

Figure 4:
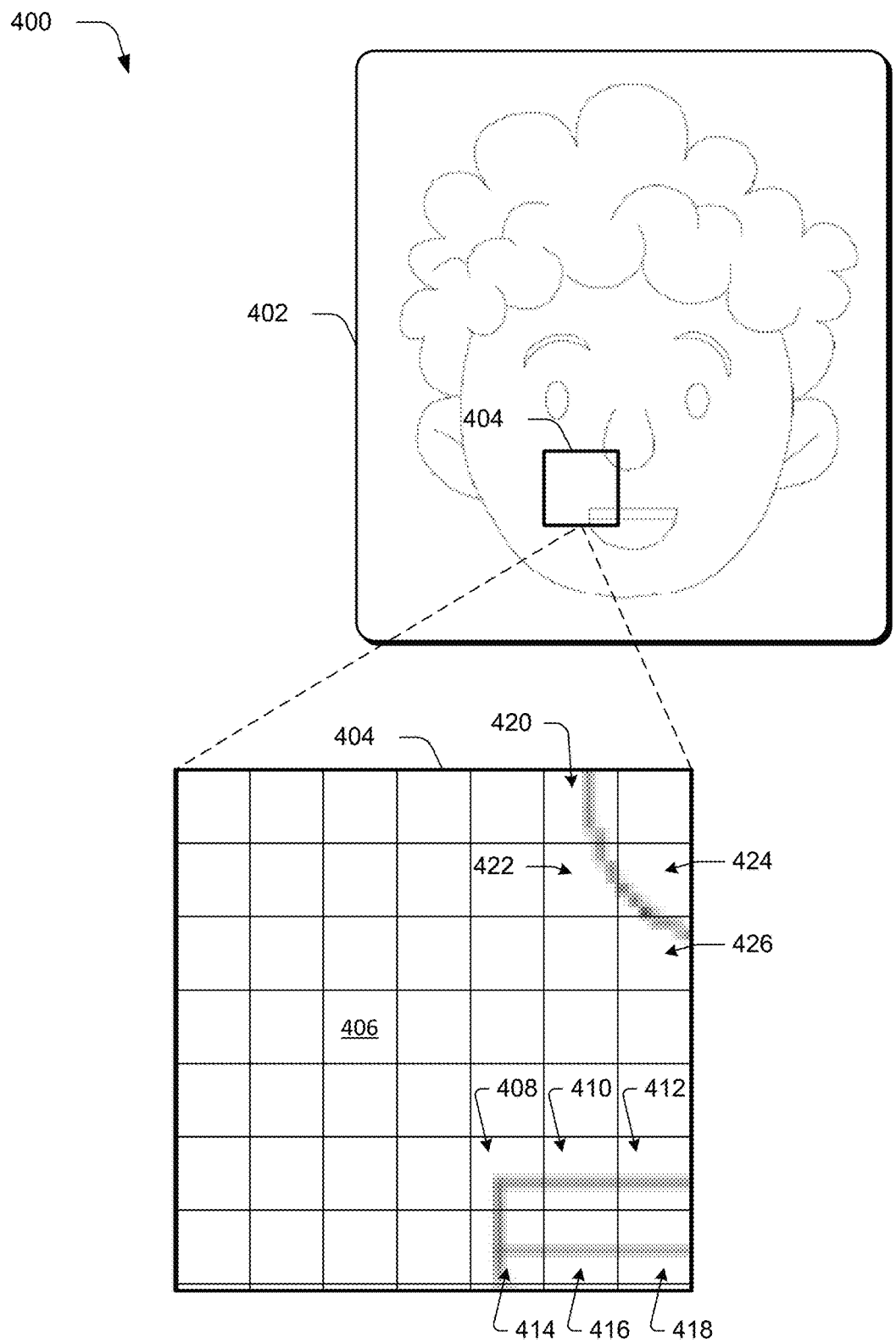
FIG. 4 depicts a digital medium environment that includes an example guide image used by the stroke-guided vectorization system of FIG. 1 to generate an aligned guide image.

FIG. 4 depicts a digital medium environment 400 that includes an example guide image that corresponds to the example input sketch of FIG. 3 and is used by the stroke-guided vectorization system 104 of FIG. 1 to generate an aligned guide image.

Figure 5:
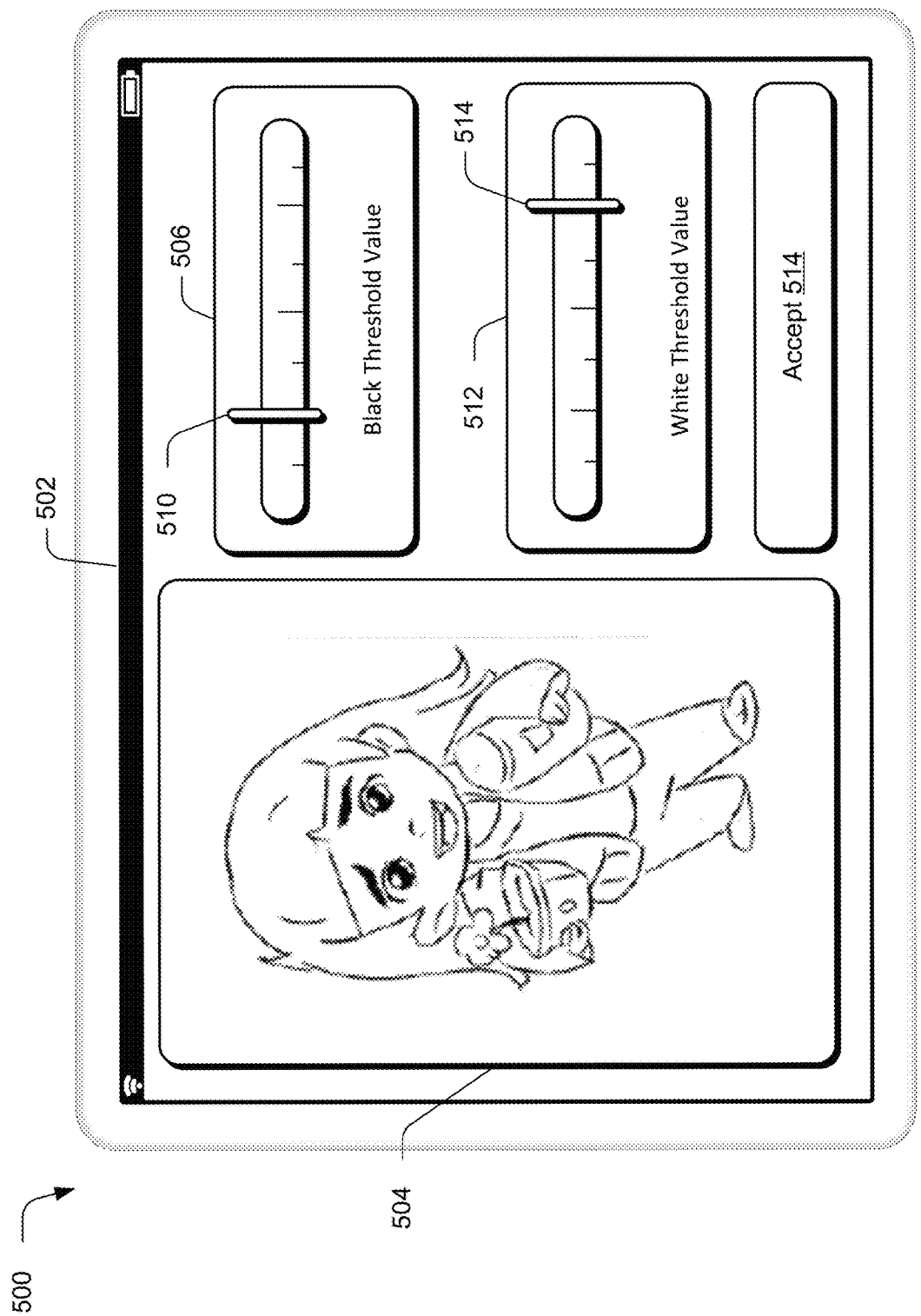
FIG. 5 depicts a digital medium environment in an example implementation that includes a user interface for the stroke-guided vectorization system 104 of FIG. 1.

FIG. 5 depicts a digital medium environment 500 in an example implementation that includes a user interface for the stroke-guided vectorization system 104 of FIG. 1.

Figure 6:
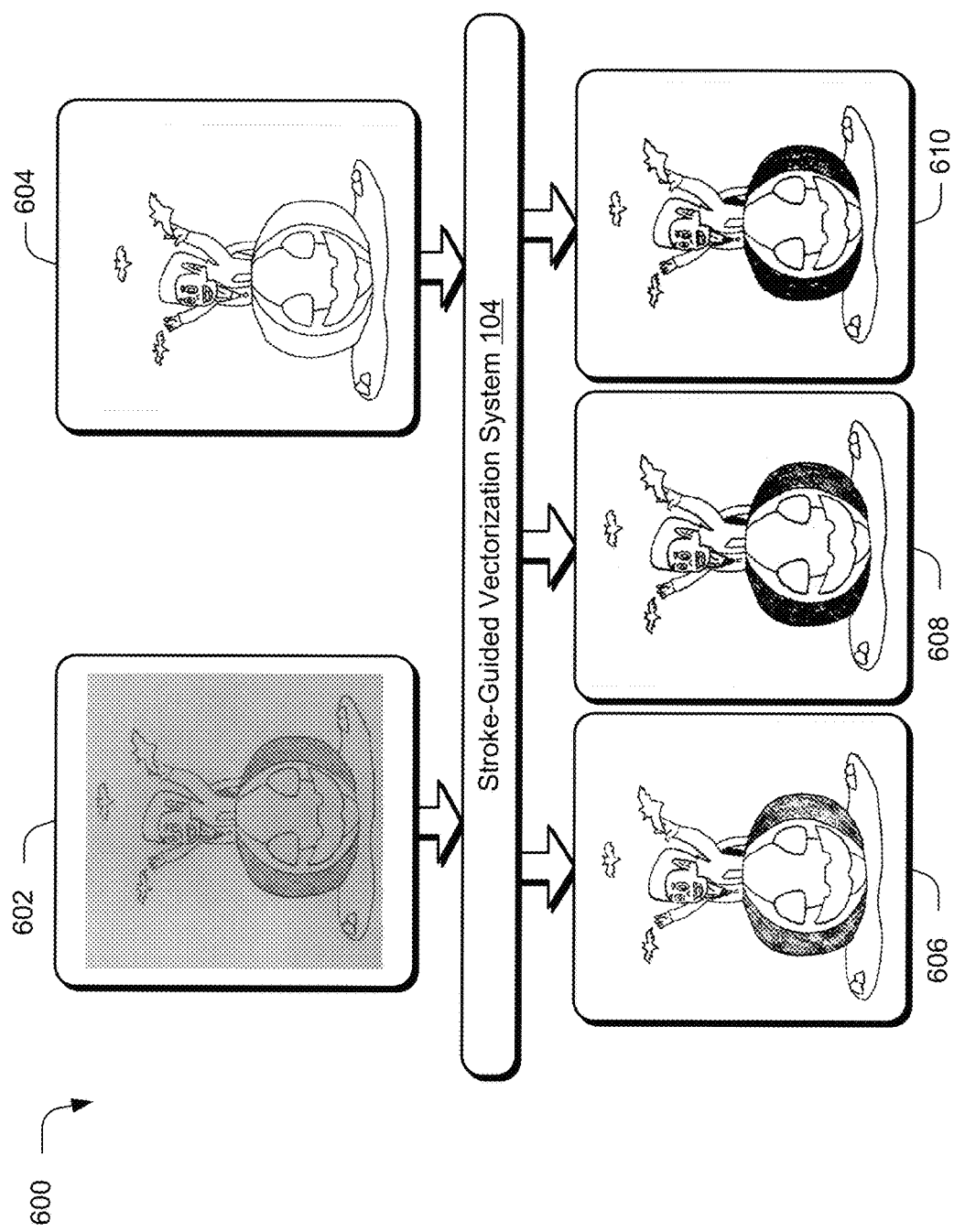
FIG. 6 depicts a digital medium environment in an example implementation that illustrates example aligned guide images generated from an input sketch and a guide image by the stroke-guided vectorization system 104 of FIG. 1.

FIG. 6 depicts a digital medium environment 600 in an example implementation that illustrates example aligned guide images 120 generated from an input sketch 110 and a guide image 112 by the stroke-guided vectorization system 104 of FIG. 1.

As illustrated in FIG. 2, the stroke-guided vectorization system 104 receives a sketch dataset 202 that includes at least one training pair 108, where each training pair 108 includes an input sketch 110 and a guide image 112. The input sketch 110 is provided to a grayscale module 204, which converts the input sketch 110 to a grayscale intensity image 206. The grayscale intensity image 206 is a representation of the input sketch 110 in grayscale format, such that each pixel in the input sketch 110 is represented by a value that indicates an intensity of the pixel from black to white. In some implementations pixels are assigned a value between zero and 255, inclusive, where zero represents black and 255 represents white. Alternatively, greyscale values are normalized such that pixel values range from zero to one, with zero indicating black and one indicating white.

The guide image 112 is provided to a smoothing module 208, which generates a smoothed guide image 210 to account for overshooting (e.g., extraneous strokes), undershooting (e.g., missing strokes), and misalignment errors in the guide image 112. To do so, the smoothing module 208 blurs and/or thresholds the guide image 112. For example, to blur the guide image 112 the smoothing module 208 performs a Gaussian blur with a radius of 1% of a width of the guide image 112. As an example of thresholding the guide image 112, the smoothing module 208 selects a threshold intensity value (e.g., 0.8) such that pixel values satisfying the threshold intensity value (e.g., greater than or equal to one) are assigned a value of one (e.g., white) and pixel values failing to satisfy the threshold intensity value are assigned a value of zero (e.g., black).

The grayscale intensity image 206 and the smoothed guide image 210 are provided to an exposure module 212, which is configured to determine sketch threshold constraints 214 for use in generating the aligned guide image 120. To do so, the exposure module 212 identifies, for each pixel in the smoothed guide image 210 including a vector stroke (e.g., a value of zero), a corresponding input sketch pixel 216 in the grayscale intensity image 206. The exposure module 212 then computes a black level 218 and a white level 220 for the input sketch pixel 216 based on observed pixel values within a fixed kernel centered on the input sketch pixel 216. For a detailed illustration of computing the black level 218 and the white level 220 for an input sketch pixel 216, consider FIG. 3.

FIG. 3 depicts an example grayscale intensity image 302 generated from an input sketch by the grayscale module 204. In the illustrated example of FIG. 3, region 304 provides a detailed view of a portion of the grayscale intensity image 302. Region 304 includes a plurality of pixels, such as pixels 306, 308(1)-308(8), and 310(1)-310(16), where pixel 306 represents an example input sketch pixel 216 for which a black level 218 and a white level 220 are computed based on pixel values within a designated radius. For example, pixels 308(1)-308(8) are pixels within a one-pixel radius of pixel 306. Pixels within a two-pixel radius of pixel 306 would include pixels 308(1)-308(8) as well as pixels 310(1)-310(16), and so forth.

In an example implementation where the exposure module 212 uses a two-pixel radius to compute the black level 218 and the white level 220 for pixel 306, the exposure module 212 considers each pixel value of pixels 308(1)-308(8) and 310(1)-310(16). The minimum pixel value among the pixels 308(1)-308(8) and 310(1)-310(16) is designated as the black level 218 for pixel 306 and the maximum pixel value among the pixels 308(1)-308(8) and 310(1)-310(16) is designated as the white level for pixel 306. Although described and illustrated as being determined using a two-pixel radius, the exposure module 212 is configured to determine sketch threshold constraints 214 using any suitable kernel size (e.g., a five-pixel radius, a nine-pixel radius, etc.).

Because the input sketch pixel 216 is selected based on a pixel in the smoothed guide image 210 including a vector, the radius of surrounding pixels ensures consideration of both pixels including artist strokes and pixels including a background of the input sketch 110. In this manner, the exposure module 212 ensures that the black level 218 captures a pixel value corresponding to an artist's stroke in the input sketch 110 and that the white level 220 captures a background of the input sketch 110. The exposure module 212 proceeds to determine sketch threshold constraints 214 for each of a plurality of input sketch pixels 216, such as for each pixel in the grayscale intensity image 206 for which a corresponding pixel in the smoothed guide image 210 includes a vector stroke. After determining the black and white levels for the plurality of input sketch pixels 216, the exposure module 212 provides the sketch threshold constraints 214 to a threshold module 222.

The threshold module 222 is configured to determine vectorization thresholds 224 for each pixel in the aligned guide image 120, where the vectorization thresholds 224 are used to define presence or absence of a vector stroke in the aligned guide image pixel 226. To do so, the threshold module 222 first determines whether an aligned guide image pixel 226 corresponds to an input sketch pixel 216 described by the sketch threshold constraints 214. For instance, consider an example scenario where the input sketch 110, the guide image 112, the grayscale intensity image 206, the smoothed guide image 210, and the aligned guide image 120 each comprise a grid of pixels spanning x pixels by y pixels. In this example scenario, the threshold module 222 first determines for an aligned guide image pixel 226 having a grid address of (x, y) whether the sketch threshold constraints 214 specify a black level 218 and a white level 220 for an input sketch pixel 216 having a grid address of (x, y). For aligned guide image pixels 226 having corresponding input sketch pixels 216 represented in the sketch threshold constraints 214, the threshold module 222 assigns the black level 218 as the black threshold 228 and assigns the white level 220 as the white threshold 230 for the aligned guide image pixel 226.

For aligned guide image pixels 226 that do not have a corresponding input sketch pixel 216 represented in the sketch threshold constraints 214, the threshold module 222 interpolates from the sketch threshold constraints 214, such that each pixel to be output as part of the aligned guide image 120 has an associated black threshold 228 and white threshold 230. For a detailed illustration of interpolating the black threshold 228 and the white threshold 230 of an aligned guide image pixel 226 from sketch threshold constraints 214, consider FIG. 4.

FIG. 4 depicts an example guide image 402, which is representative of a guide image 112 or a smoothed guide image 210 as introduced with respect to FIGS. 1 and 2. In the illustrated example of FIG. 4, region 404 provides a detailed view of a portion of the guide image 402. Specifically, region 404 includes a plurality of pixels of the guide image 402, such as pixels 406, 408, 410, 412, 414, 416, 418, 420, 422, 424, and 426. Each of pixels 408, 410, 412, 414, 416, 418, 420, 422, 424, and 426 include at least a portion of a vector stroke, and are thus individually associated with a black level 218 and a white level 220 defined in the sketch threshold constraints 214. Consequently, for each of the of pixels 408, 410, 412, 414, 416, 418, 420, 422, 424, and 426, the threshold module 222 assigns the black level 218 and the white level 220 associated with the corresponding input sketch pixel 216, respectively, as the black threshold 228 and the white threshold 230 for the corresponding aligned guide image pixel 226.

In contrast to pixels 408, 410, 412, 414, 416, 418, 420, 422, 424, and 426, however, pixel 406 does not include a portion of a vector stroke and is thus representative for a pixel with no corresponding data defining a black level 218 or a white level 220 in the sketch threshold constraints 214. Because pixel 406 is unconstrained by the sketch threshold constraints 214, the threshold module 222 is configured to determine the vectorization thresholds 224 for an aligned guide image pixel 226 that corresponds to the pixel 406. To do so, the threshold module 222 utilizes sketch threshold constraints 214 associated with a nearest set of constrained points and interpolates to identify the vectorization thresholds 224 for an aligned guide image pixel 226 corresponding to the pixel 406.

For instance, consider an example implementation where the threshold module 222 interpolates vectorization thresholds 224 using the black level 218 and the white level 220 associated with a nearest ten neighbors. In this example implementation, pixels 408, 410, 412, 414, 416, 418, 420, 422, 424, and 426 represent the nearest ten neighbors to pixel 406 having data defining their associated black levels 218 and white levels 220. To determine the black threshold 228 for the aligned guide image pixel 226 corresponding to pixel 406, the threshold module 222 interpolates the black levels 218 associated with each of pixels 408, 410, 412, 414, 416, 418, 420, 422, 424, and 426. Similarly, to determine the white threshold 230 for the aligned guide image pixel 226 corresponding to pixel 406, the threshold module 222 interpolates the white levels 220 associated with each of pixels 408, 410, 412, 414, 416, 418, 420, 422, 424, and 426. Interpolating the black or white levels associated with the nearest neighbors is performable using a variety of interpolation techniques, such as nearest neighbor interpolation, natural neighbor interpolation, and so forth. Although described with respect to an example implementation of considering the ten nearest neighbors, the threshold module 222 is configured to interpolate black and white levels from any suitable number of nearby pixels described in the sketch threshold constraints 214.

The threshold module 222 is configured to determine vectorization thresholds 224 for each aligned guide image pixel 226 in this manner, leveraging direct black and white levels defined by the sketch threshold constraints 214 as black and white thresholds for the aligned guide image pixel's 226 vectorization thresholds 224 or interpolating from neighboring pixels when corresponding levels are not directly defined by the sketch threshold constraints 214. The vectorization thresholds 224 including a black threshold 228 and a white threshold 230 for each aligned guide image pixel 226 are then passed to a vectorization module 232.

The vectorization module 232 is configured to generate the aligned guide image 120 by comparing pixel values of the grayscale intensity image 206 to the black threshold 228 and the white threshold 230 of a corresponding aligned guide image pixel 226. As noted above, correspondence between a pixel in the grayscale intensity image 206 and an aligned guide image pixel 226 of the aligned guide image 120 refers to pixels having a common position relative to a two-dimensional grid. The vectorization module 232 compares, for each pixel in the grayscale intensity image 206, its pixel value relative to the black threshold 228 and the white threshold 230 of a corresponding aligned guide image pixel 226. If the pixel value fails to satisfy (e.g., is less than) the black threshold 228, the vectorization module 232 designates the aligned guide image pixel 226 for mapping to a vector stroke. Conversely, if the pixel value satisfies (e.g., is greater than) the white threshold 230, the vectorization module 232 designates the aligned guide image pixel 226 for mapping to a background of the aligned guide image 120.

For pixel values that satisfy the black threshold 228 and fail to satisfy the white threshold 230 (e.g., pixel values between the black and white thresholds), the vectorization module 232 interpolates between the black threshold 228 and the white threshold 230 to determine whether the aligned guide image pixel 226 maps to a vector stroke or a background. For instance, the vectorization module 232 is configured to perform linear interpolation between the black threshold 228 and the white threshold 230 to determine whether the aligned guide image pixel 226 maps to a vector stroke or a background.

The vectorization module 232 is further configured to account for outer boundaries of the aligned guide image 120, such as pixel values associated with a minimum x-value, a minimum y-value, a maximum x-value, or a maximum y-value in an example implementation where pixels of the aligned guide image 120 are mapped on an x, y grid. To do so, the vectorization module 232 enforces a boundary constraint for each aligned guide image pixel 226 disposed on an outer boundary of the aligned guide image 120. The boundary constraint enforced by the vectorization module 232 presumes that there should not be any vector strokes abutting the outer boundary of the aligned guide image 120 and forces the darkest pixel value in the corresponding aligned guide image pixel 226 to map to background (e.g., non-vector stroke) in the aligned guide image 120.

After mapping each aligned guide image pixel 226 to a vector stroke or a background, the vectorization module 232 defines at least one vector path according to the mapped vector strokes and outputs the at least one vector path as the aligned guide image 120. In some implementations, outputting the aligned guide image 120 comprises storing the aligned guide image 120 in the training pair 108 from which the aligned guide image 120 was generated. For instance, the aligned guide image 120 is configured to overwrite data representing the guide image 112 with data representing the aligned guide image 120, thus replacing the guide image 112 with the aligned guide image 120 in the training pair 108. In this manner, outputting the aligned guide image 120 includes storing the aligned guide image 120 (e.g., as digital content 114 in storage 116 of the computing device 102 implementing the stroke-guided vectorization system 104).

Alternatively or additionally, outputting the aligned guide image 120 comprises displaying the aligned guide image 120, such as via a user interface for the stroke-guided vectorization system 104 via a computing display device.

FIG. 5 depicts an example implementation of a user interface 502 for the stroke-guided vectorization system 104 that includes a display of an aligned guide image 504 generated using the techniques described herein. In the illustrated example of FIG. 5, the user interface 502 includes controls 506 and 508, which are configured to enable adjustment of black and white threshold values associated with at least a portion of the aligned guide image 504.

For instance, control 506 is configured as a slider with a position indicator 510 that represents a black threshold value used to define one or more regions of the aligned guide image 504. For instance, the position indicator 510 is configured to represent an average of the black thresholds 228 associated with a plurality of aligned guide image pixels 226 (e.g., pixels comprising a portion or entirety of the aligned guide image 120). Alternatively, the position indicator 510 is configured to represent a black threshold 228 for a single portion of the aligned guide image 504, such as for a specific aligned guide image pixel 226 of the aligned guide image 120.

In a similar manner, control 508 is configured as a slider with a position indicator 512 that represents a white threshold value used to define one or more regions of the aligned guide image 504. For instance, the position indicator 512 is configured to represent an average of the white thresholds 230 associated with a plurality of aligned guide image pixels 226. Alternatively, the position indicator 510 is configured to represent a white threshold 230 for a single portion of the aligned guide image 504 (e.g., a selected aligned guide image pixel 226 of the aligned guide image 120).

Although not depicted in the illustrated example, the user interface 502 is configured to include one or more tools that enable selection of a portion of the aligned guide image 504. As an example, the user interface 502 is configured to include a lasso tool that enables a user of the stroke-guided vectorization system 104 to define a freeform region relative to the aligned guide image 504. In this example, in response to receiving input defining a freeform region relative to the aligned guide image 504, the controls 506 and 508 are configured to provide an indication (e.g., an average value) of the black thresholds 228 and white thresholds 230 encompassed by the region.

In response to receiving user input at one or more of the controls 506 or 508 that defines a new black threshold 228 and/or white threshold 230, the stroke-guided vectorization system 104 is configured to update the aligned guide image 504. In this manner, the user interface 502 provides a user of the stroke-guided vectorization system 104 with real-time feedback regarding how different threshold values affect a resulting appearance of the aligned guide image 504. To do so, input to one or more of the controls 506 or 508 is provided to the threshold module 222, represented as user input 234 in FIG. 2. The user input 234 includes information describing at least one aligned guide image pixel 226 and at least one of a black threshold 228 or a white threshold 230 for the aligned guide image pixel 226. Thresholds updated via user input 234 are included in updated vectorization thresholds 224 and provided to the vectorization module 232. The vectorization module 232 then generates an updated instance of the aligned guide image 120 using the updated vectorization thresholds 224 and modifies the user interface 502 to display the updated instance of the aligned guide image 120 as aligned guide image 504.

In this manner, the user interface 502 is representative of functionality of the stroke-guided vectorization system 104 that enables a user to adjust parameters defining a visual appearance of the aligned guide image 120. Although described and illustrated as being configured in a slider control format, the controls 506 and 508 are configurable in any suitable format. For instance, the controls 506 and 508 are configurable as scroll wheels, numeric displays, data entry fields, combinations thereof, and so forth. Further, although illustrated as being separate controls, the user interface 502 is configured to include a single control that enables adjustment of both black and white threshold values (e.g., a single slider control including separate position indicators for black and white threshold values). The user interface 502 further includes a selectable control 514 to indicate acceptance of the black and white threshold values associated with one or more regions (e.g., pixels) of the aligned guide image 504.

FIG. 6 depicts examples of different aligned guide images 120 generated from a common input sketch 110 and a guide image 112 using different white and black threshold values. For instance, in the illustrated example of FIG. 6, input sketch 602 is representative of an input sketch 110 and guide image 604 is representative of a guide image 112 received by the stroke-guided vectorization system 104. Aligned guide images 606, 608, and 610 represent different instances of an aligned guide image 120 generated from the input sketch 602 and the guide image 604, where each of the aligned guide images 606, 608, and 610 is generated using different vectorization thresholds 224 for at least one region of the aligned guide image.

For example, vectorization thresholds 224 used to generate the aligned guide image 606 include a greater black threshold 228 value relative to a black threshold 228 value used to generate the aligned guide image 608. In turn, the vectorization thresholds 224 used to generate the aligned guide image 610 include a lower black threshold 228 value relative to the black threshold 228 value used to generate the aligned guide image 608. Alternatively or additionally, vectorization thresholds 224 used to generate the aligned guide image 606 include a lower white threshold 230 value relative to a white threshold 230 value used to generate the aligned guide image 608. In turn, the vectorization thresholds 224 used to generate the aligned guide image 610 include a greater white threshold 230 value relative to the white threshold 230 value used to generate the aligned guide image 608.

Thus, controls provided by the user interface 502 of the stroke-guided vectorization system 104 enable a user to fine-tune an exposure at which the aligned guide image 120 is generated from the input sketch 110 and guide image 112. As illustrated by FIG. 6, the aligned guide images 606, 608, and 610 generated by the stroke-guided vectorization system 104 represent an improved vector representation of the input sketch 602 relative to the guide image 604. Using the techniques described herein, the stroke-guided vectorization system 104 is configured to generate aligned guide images 120 that capture imperfections, nuances, and detail (e.g., fill regions, shading, stroke paths, etc.) depicted in an input sketch 110. The resulting aligned guide image 120 further exhibits improved alignment with the input sketch 110 relative to the guide image 112. Consequently, the stroke-guided vectorization system 104 enables an image translation system 106 trained on a training pair including the input sketch 110 and the aligned guide image 120 to infer translations more accurately between sketch and vector image distributions, relative to the same image translation system 106 trained on a training pair including the input sketch 110 and the guide image 112.

Having considered example systems and techniques, consider now example procedures to illustrate aspects of the techniques described herein.

Example Procedures

The following discussion describes techniques that are configured to be implemented utilizing the previously described systems and devices. Aspects of each of the procedures are configured for implementation in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-6.

Figure 7:
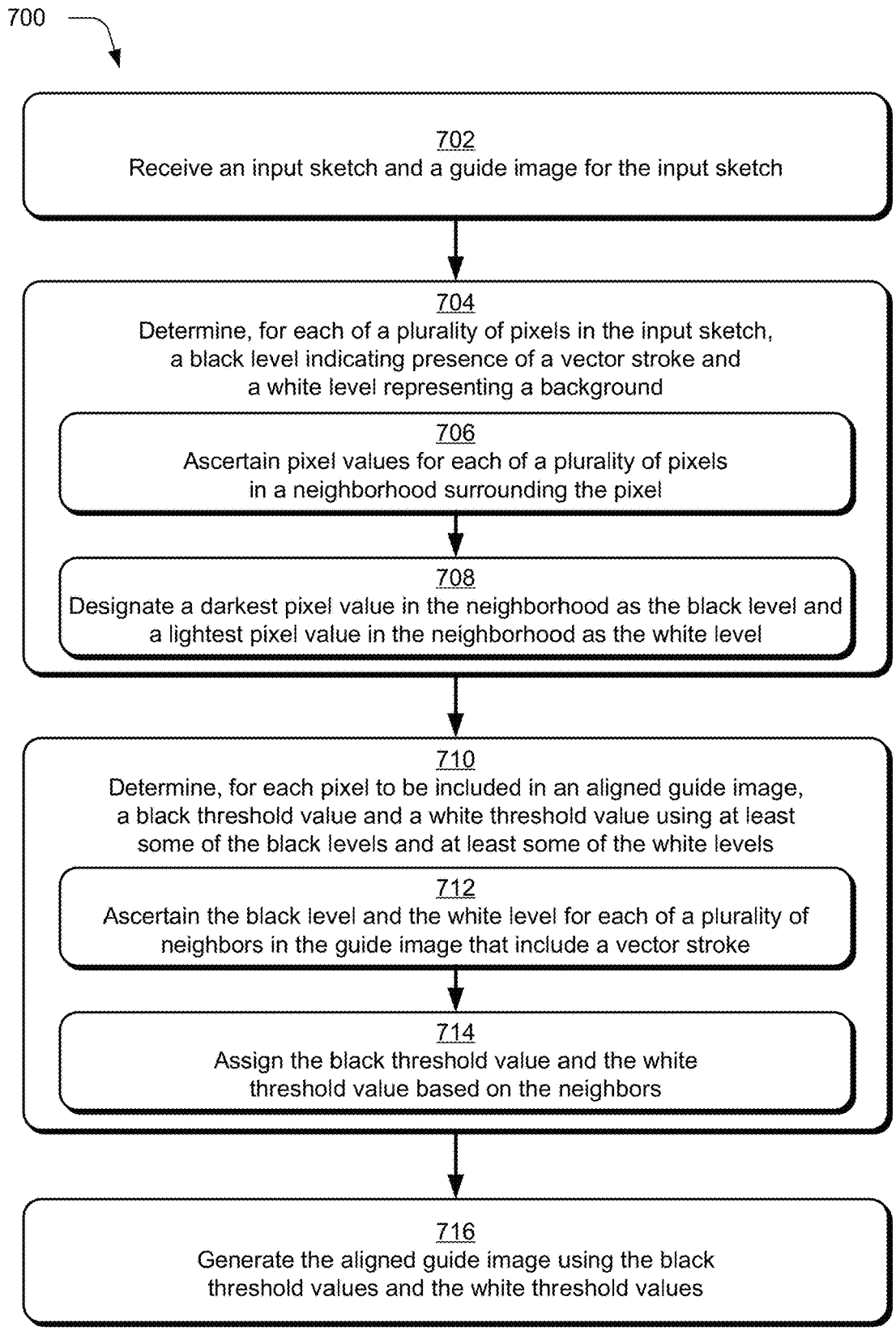
FIG. 7 is a flow diagram depicting a procedure in an example implementation of generating an aligned guide image for replacing a guide image in a training pair that includes the guide image and a corresponding input sketch using the techniques described herein.

FIG. 7 is a flow diagram depicting a procedure 700 in an example implementation of generating an aligned guide image that includes a vector representation of an input sketch, using the input sketch and a guide image that includes an approximate vector representation of the input sketch. To begin, an input sketch and a guide image for the input sketch are received (block 702). The stroke-guided vectorization system 104, for instance, receives a sketch dataset 202 that includes at least one training pair 108 comprising an input sketch 110 and a guide image 112. In implementations, the sketch dataset 202 is received from storage 116 of a computing device implementing the stroke-guided vectorization system 104, from a remote storage location (e.g., via network 118), or combinations thereof.

For each of a plurality of pixels in the input sketch, a black level indicating presence of a vector stroke and a white level indicating representing a background in the input sketch is determined (block 704). The grayscale module 204, for instance, generates a grayscale intensity image 206 from the input sketch 110 and the smoothing module 208 generates a smoothed guide image 210 from the guide image 112. The exposure module 212 determines sketch threshold constraints 214 for each of a plurality of input sketch pixels 216 using the grayscale intensity image 206 and the smoothed guide image 210.

As part of determining the black level and the white level for each of the plurality of pixels in the input sketch, pixel values for each of a plurality of pixels in a neighborhood surrounding the pixel are ascertained (block 706). The exposure module 212, for instance, identifies for each pixel in the smoothed guide image 210 including a vector stroke (e.g., a value of zero), a corresponding input sketch pixel 216 in the grayscale intensity image 206. The exposure module 212 then ascertains pixel values for pixels within a fixed kernel centered on the input sketch pixel 216. For instance, in an example implementation where the fixed kernel is a two-pixel radius and the input sketch pixel 216 is pixel 306, the exposure module 212 ascertains pixel values associated with each of pixels 308(1)-308(8) and 310(1)-310(16).

A darkest pixel value in the neighborhood is designated as the black level for the pixel and a lightest pixel value in the neighborhood is designated as the white level for the pixel (block 708). Continuing the two-pixel radius example illustrated in FIG. 3, the exposure module 212 designates the minimum pixel value among the pixels 308(1)-308(8) and 310(1)-310(16) as the black level 218 for pixel 306 and designates the maximum pixel value among the pixels 308(1)-308(8) and 310(1)-310(16) as the white level for pixel 306. The exposure module 212 repeats this process of determining black and white levels for each of a plurality of pixels in the grayscale intensity image 206 having a corresponding pixel in the smoothed guide image 210 that includes a vector stroke.

For each pixel to be included in an aligned guide image for the input sketch, a black threshold value and a white threshold value are determined using at least some of the black levels and at least some of the white levels (block 710). To do so, the black level and the white level associated with each of a plurality of neighbors that include a vector stroke are ascertained (block 712). The black threshold value and the white threshold value are then assigned for to the pixel based on the neighbors (block 714).

The threshold module 222, for instance, determines whether an aligned guide image pixel 226 corresponds to an input sketch pixel 216 described by the sketch threshold constraints 214. In an example scenario where the input sketch 110, the guide image 112, the grayscale intensity image 206, the smoothed guide image 210, and the aligned guide image 120 each comprise a grid of pixels spanning x pixels by y pixels. In this example scenario, the threshold module 222 first determines for an aligned guide image pixel 226 having a grid address of (x, y) whether the sketch threshold constraints 214 specify a black level 218 and a white level 220 for an input sketch pixel 216 having a grid address of (x, y).

For aligned guide image pixels 226 having corresponding input sketch pixels 216 represented in the sketch threshold constraints 214, the threshold module 222 assigns the black level 218 as the black threshold 228 and assigns the white level 220 as the white threshold 230 for the aligned guide image pixel 226. For aligned guide image pixels 226 that do not have a corresponding input sketch pixel 216 represented in the sketch threshold constraints 214, the threshold module 222 interpolates from the sketch threshold constraints 214, such that each pixel to be output as part of the aligned guide image 120 has an associated black threshold 228 and white threshold 230.

With respect to FIG. 4, pixel 406 represents an aligned guide image pixel 226 that does not have a corresponding input sketch pixel 216 represented in the sketch threshold constraints 214. To determine the black threshold 228 for the aligned guide image pixel 226 corresponding to pixel 406, the threshold module 222 interpolates the black levels 218 associated with each of pixels 408, 410, 412, 414, 416, 418, 420, 422, 424, and 426. Similarly, to determine the white threshold 230 for the aligned guide image pixel 226 corresponding to pixel 406, the threshold module 222 interpolates the white levels 220 associated with each of pixels 408, 410, 412, 414, 416, 418, 420, 422, 424, and 426. Interpolating the black or white levels associated with the nearest neighbors is performable using a variety of interpolation techniques, such as nearest neighbor interpolation, natural neighbor interpolation, and so forth. Although described with respect to an example implementation of considering the ten nearest neighbors, the threshold module 222 is configured to interpolate black and white levels from any suitable number of nearby pixels described in the sketch threshold constraints 214.

The aligned guide image is then generated using the black threshold values and the white threshold values (block 716). The vectorization module 232, for instance, generates the aligned guide image 120 by comparing pixel values of the grayscale intensity image 206 to the black threshold 228 and the white threshold 230 of a corresponding aligned guide image pixel 226. If the pixel value fails to satisfy (e.g., is less than) the black threshold 228, the vectorization module 232 designates the aligned guide image pixel 226 for mapping to a vector stroke. Conversely, if the pixel value satisfies (e.g., is greater than) the white threshold 230, the vectorization module 232 designates the aligned guide image pixel 226 for mapping to a background of the aligned guide image 120.

For pixel values that satisfy the black threshold 228 and fail to satisfy the white threshold 230 (e.g., pixel values between the black and white thresholds), the vectorization module 232 interpolates between the black threshold 228 and the white threshold 230 to determine whether the aligned guide image pixel 226 maps to a vector stroke or a background. For instance, the vectorization module 232 is configured to perform linear interpolation between the black threshold 228 and the white threshold 230 to determine whether the aligned guide image pixel 226 maps to a vector stroke or a background.

Having described example procedures in accordance with one or more implementations, consider now an example system and device to implement the various techniques described herein.

Example System and Device

Figure 8:
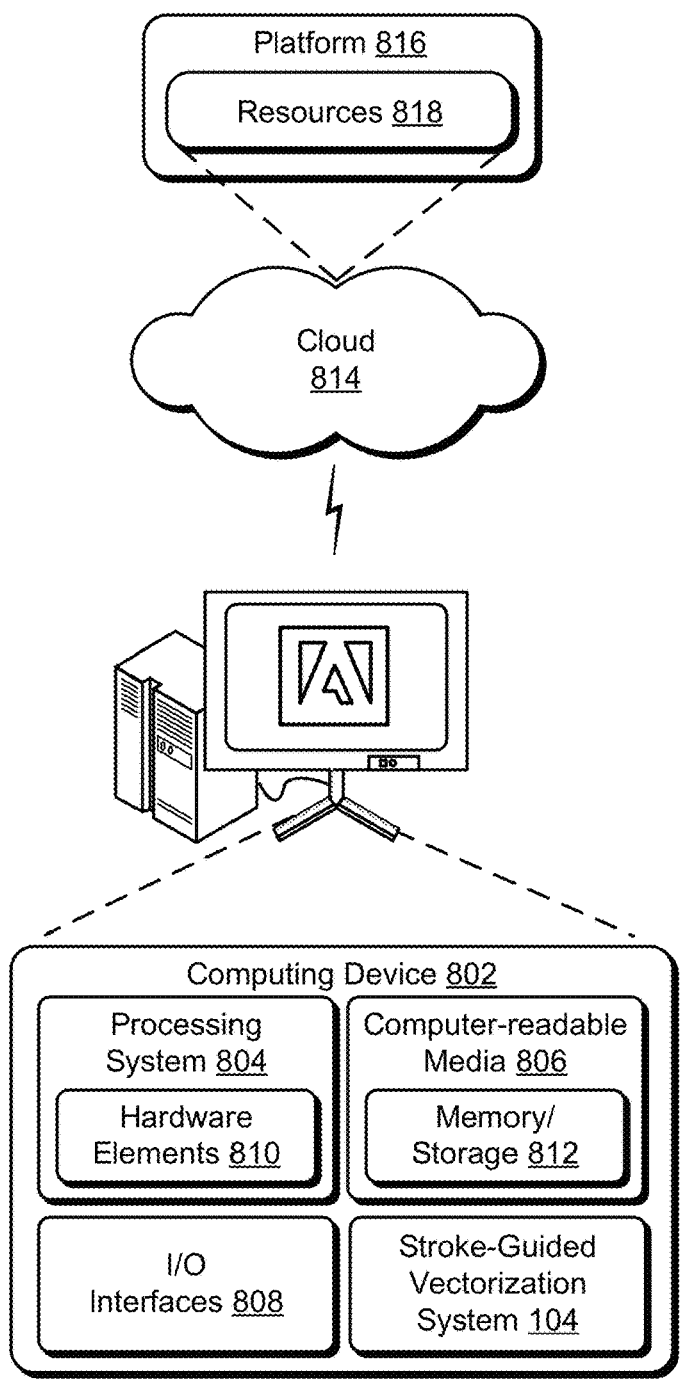
FIG. 8 illustrates an example system including various components of an example device to implement the techniques described with reference to FIGS. 1-7.

FIG. 8 illustrates an example system 800 that includes an example computing device 802, which is representative of one or more computing systems and/or devices that implement the various techniques described herein. This is illustrated through inclusion of the stroke-guided vectorization system 104. The computing device 802 is configured, for example, as a service provider server, as a device associated with a client (e.g., a client device), as an on-chip system, and/or as any other suitable computing device or computing system.

The example computing device 802 as illustrated includes a processing system 804, one or more computer-readable media 806, and one or more I/O interface 808 that are communicatively coupled, one to another. Although not shown, the computing device 802 is further configured to include a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that are configurable as processors, functional blocks, and so forth. For instance, hardware element 810 is implemented in hardware as an application specific integrated circuit or other logic device formed using one or more semiconductors. The hardware elements 810 are not limited by the materials from which they are formed, or the processing mechanisms employed therein. For example, processors are alternatively or additionally comprised of semiconductor(s) and/or transistors (e.g., electronic integrated circuits (ICs)). In such a context, processor-executable instructions are electronically executable instructions.

The computer-readable storage media 806 is illustrated as including memory/storage 812. The memory/storage 812 represents memory/storage capacity associated with one or more computer-readable media. The memory/storage 812 is representative of volatile media (such as random-access memory (RAM)) and/or nonvolatile media (such as read only memory (ROM), Flash memory, optical disks, magnetic disks, and so forth). The memory/storage 812 is configured to include fixed media (e.g., RAM, ROM, a fixed hard drive, and so on) as well as removable media (e.g., Flash memory, a removable hard drive, an optical disc, and so forth). In certain implementations, the computer-readable media 806 is configured in a variety of other ways as further described below.

Input/output interface(s) 808 are representative of functionality to allow a user to enter commands and information to computing device 802 and allow information to be presented to the user and/or other components or devices using various input/output devices. Examples of input devices include a keyboard, a cursor control device (e.g., a mouse), a microphone, a scanner, touch functionality (e.g., capacitive, or other sensors that are configured to detect physical touch), a camera (e.g., a device configured to employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 is representative of a variety of hardware configurations as further described below to support user interaction.

Various techniques are described herein in the general context of software, hardware elements, or program modules. Generally, such modules include routines, programs, objects, elements, components, data structures, and so forth that perform particular tasks or implement particular data types. The terms "module," "functionality," and "component" as used herein generally represent software, firmware, hardware, or a combination thereof. The features of the techniques described herein are platform-independent, meaning that the techniques are configured for implementation on a variety of commercial computing platforms having a variety of processors.

An implementation of the described modules and techniques are stored on or transmitted across some form of computer-readable media. The computer-readable media include a variety of media that is accessible by the computing device 802. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information for access by a computer.

"Computer-readable signal media" refers to a signal-bearing medium that is configured to transmit instructions to the hardware of the computing device 802, such as via a network. Signal media typically embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that is employed in some embodiments to implement at least some aspects of the techniques described herein, such as to perform one or more instructions. Hardware, in certain implementations, includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are employed to implement various techniques described herein. Accordingly, software, hardware, or executable modules are implemented as one or more instructions and/or logic embodied on some form of computer-readable storage media and/or by one or more hardware elements 810. The computing device 802 is configured to implement instructions and/or functions corresponding to the software and/or hardware modules. Accordingly, implementation of a module that is executable by the computing device 802 as software is achieved at least partially in hardware, e.g., through use of computer-readable storage media and/or hardware elements 810 of the processing system 804. The instructions and/or functions are executable/operable by one or more articles of manufacture (for example, one or more computing devices 802 and/or processing systems 804) to implement techniques, modules, and examples described herein.

The techniques described herein are supported by various configurations of the computing device 802 and are not limited to the specific examples of the techniques described herein. This functionality is further configured to be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 include applications and/or data that is utilized while computer processing is executed on servers that are remote from the computing device 802. Resources 818 also include services provided over the Internet and/or through a subscriber network, such as a cellular or Wi-Fi network.

The platform 816 is configured to abstract resources and functions to connect the computing device 802 with other computing devices. The platform 816 is further configured to abstract scaling of resources to provide a corresponding level of scale to encountered demand for the resources 818 that are implemented via the platform 816. Accordingly, in an interconnected device embodiment, implementation of functionality described herein is configured for distribution throughout the system 800. For example, in some configurations the functionality is implemented in part on the computing device 802 as well as via the platform 816 that abstracts the functionality of the cloud 814.

Although the invention has been described in language specific to structural features and/or methodological acts, the invention defined in the appended claims is not necessarily limited to the specific features or acts described. Rather, the specific features and acts are disclosed as example forms of implementing the claimed invention.

What is claimed is:

1. In a digital medium environment, a method comprising:
   receiving, by a computing device, an input sketch and a guide image that includes an approximate vector representation of the input sketch;
   determining, by the computing device, a plurality of black levels representing a vector stroke in the input sketch and a plurality of white levels representing a background in the input sketch, the plurality of black levels including, for each of a plurality of pixels in the input sketch, a black level representing the vector stroke in the pixel and the plurality of white levels including, for each of the plurality of pixels in the input sketch, a white level representing a background in the pixel; and
   generating, by the computing device, an aligned guide image that includes a vector representation of the input sketch by:
      determining, for each of a plurality of aligned guide image pixels, a black threshold value using at least two of the plurality of black levels and a white threshold value using at least two of the plurality of white levels, the white threshold value being different than the black threshold value; and
      mapping each of the plurality of aligned guide image pixels to a vector stroke in the aligned guide image or a background in the aligned guide image based on the black threshold value and the white threshold value for the aligned guide image pixel.

2. The method of claim 1, further comprising generating a grayscale intensity image from the input sketch, wherein determining the plurality of black levels and the plurality of white levels is performed using the grayscale intensity image.

3. The method of claim 1, further comprising generating a smoothed guide image from the guide image and identifying the plurality of pixels in the input sketch based on a corresponding pixel in the smoothed guide image that includes a vector stroke in the smoothed guide image.

4. The method of claim 1, wherein determining the black level and the white level for each of the plurality of pixels in the input sketch comprises selecting a neighborhood of pixels surrounding the pixel in the input sketch and determining, for each pixel in the neighborhood of pixels, a pixel value specifying an intensity of the pixel.

5. The method of claim 4, wherein determining the plurality of black levels comprises designating, for each of the plurality of pixels in the input sketch, a minimum one of the pixel values specifying the intensity of each pixel in the neighborhood of pixels as the black level for the pixel in the input sketch.

6. The method of claim 4, wherein determining the plurality of white levels comprises designating, for each of the plurality of pixels in the input sketch, a maximum one of the pixel values specifying the intensity of each pixel in the neighborhood of pixels as the white level for the pixel in the input sketch.

7. The method of claim 1, wherein determining the black threshold value and the white threshold value for each of the plurality of aligned guide image pixels comprises assigning the black level associated with a corresponding one of the plurality of pixels in the input sketch as the black threshold value and assigning the white level associated with the corresponding one of the plurality of pixels in the input sketch as the white threshold value in response to determining that the corresponding one of the plurality of pixels in the input sketch depicts a vector stroke in the input sketch.

8. The method of claim 1, wherein determining the black threshold value for each of the plurality of aligned guide image pixels comprises interpolating black levels associated with pixels neighboring a corresponding one of the plurality of pixels in the input sketch responsive to determining that the corresponding one of the plurality of pixels in the input sketch depicts a background of the input sketch.

9. The method of claim 1, wherein determining the white threshold value for each of the plurality of aligned guide image pixels comprises interpolating white levels associated with pixels neighboring a corresponding one of the plurality of pixels in the input sketch responsive to determining that the corresponding one of the plurality of pixels in the input sketch depicts a background of the input sketch.

10. The method of claim 1, further comprising adjusting one or more of the white threshold value or the black threshold value associated with at least one of the plurality of aligned guide image pixels and updating the aligned guide image using the adjusted one or more of the white threshold value or the black threshold value associated with at least one of the plurality of aligned guide image pixels.

11. The method of claim 1, further comprising updating a training pair that includes the input sketch and the guide image by overwriting the guide image with the aligned guide image and training a machine learning model to translate from a sketch image distribution to a vector representation distribution using the updated training pair.

12. One or more computer-readable storage media storing instructions that, responsive to execution by a processing system, cause the processing system to perform operations comprising:
generating an aligned guide image from an image of a sketch and a guide image that includes an approximate vector representation of the sketch by:
determining, for each pixel in the image of the sketch, a black level representing a vector stroke of the image of the sketch and a white level representing a background of the image of the sketch; and
determining, for each pixel in the aligned guide image, a black threshold value using at least two of the black levels and a white threshold value using at least two of the white levels;
receiving an input corresponding to at least one of a white value or a black value for adjusting a portion of the aligned guide image;
adjusting at least one of the white threshold value that defines a background for the portion of the aligned guide image or the black threshold value that defines a vector stroke included in the portion of the aligned guide image based on the received input; and
generating an updated instance of the aligned guide image using at least one of the adjusted white threshold value or the black threshold value.

13. The one or more computer-readable storage media of claim 12, the operations further comprising updating a training dataset that includes the image of the sketch and the guide image by replacing the guide image with the updated instance of the aligned guide image.

14. The one or more computer-readable storage media of claim 13, the operations further comprising training a machine learning model using the updated training dataset to generate a trained machine learning model that maps images of sketches to vector representations of the images of sketches.

15. The one or more computer-readable storage media of claim 12, wherein determining the white threshold value that defines the background for the portion of the aligned guide image comprises interpolating at least two of the white levels associated with pixels neighboring a pixel in the image of the sketch that correspond to the portion of the aligned guide image responsive to determining that the pixel in the image of the sketch includes a background of the image of the sketch.

16. The one or more computer-readable storage media of claim 12, wherein determining the black threshold value that defines the vector stroke for the portion of the aligned guide image comprises interpolating at least two of the black levels associated with pixels neighboring a pixel in the image of the sketch that correspond to the portion of the aligned guide image responsive to determining that the pixel in the image of the sketch includes a background of the image of the sketch.

17. The one or more computer-readable storage media of claim 12, wherein determining the white threshold value that defines the background for the portion of the aligned guide image and determining the black threshold value that defines the vector stroke for the portion of the aligned guide image comprises assigning the black level and the white level associated with a pixel in the image of the sketch that corresponds to the portion of the aligned guide image responsive to determining that the pixel in the image of the sketch includes a vector stroke in the image of the sketch.

18. The one or more computer-readable storage media of claim 12, wherein the aligned guide image depicts at least one portion of the sketch not depicted by the guide image.

19. A system comprising:
at least one processor; and
a memory component coupled to the at least one processor, the at least one processor to:
obtain a training dataset that includes a plurality of training pairs, each training pair including an image of a sketch and a guide image that includes an approximate vector representation of the sketch;
for at least one of the plurality of training pairs, generate an aligned guide image that includes a vector representation of the sketch, by:
determining, for each pixel in the image of the sketch, a black level and a white level; and
classifying each pixel in the aligned guide image as a vector stroke using at least two of the black levels or a background using at least two of the white levels;
update the training dataset by replacing the guide image with the aligned guide image; and
use the updated training dataset to train a machine learning model to generate a trained machine learning model that maps a distribution of input sketch images to vector representations of the input sketch images.

20. The system of claim 19, wherein determining the black level and the white level, for each pixel in the image of the sketch, comprises selecting a neighborhood of pixels surrounding the pixel in the image of the sketch and determining, for each pixel in the neighborhood of pixels, a pixel value specifying an intensity of the pixel.

* * * * *